(12) United States Patent
Vargas (10) Patent No.: US 8,793,792 B2
(45) Date of Patent: Jul. 29, 2014

(54) TIME-KEY HOPPING

(75) Inventor: Bogart Vargas, Arlington, VA (US)

(73) Assignee: Raytheon Company, Waltham, MA (US)

(*) Notice: Subject to any disclaimer, the term of this patent is extended or adjusted under 35 U.S.C. 154(b) by 216 days.

(21) Appl. No.: 13/101,402

(22) Filed: May 5, 2011

(65) Prior Publication Data

US 2011/0277032 A1 Nov. 10, 2011

Related U.S. Application Data

(60) Provisional application No. 61/332,609, filed on May 7, 2010, provisional application No. 61/332,578, filed on May 7, 2010.

(51) Int. Cl.
*H04L 29/06* (2006.01)
(52) U.S. Cl.
CPC .......... *H04L 63/0428* (2013.01); *H04L 63/164* (2013.01); *H04L 63/1441* (2013.01); *H04L 63/0414* (2013.01)
USPC ............................. 726/23; 380/255; 713/162
(58) Field of Classification Search
CPC ............ H04L 63/0414; H04L 63/0428; H04L 63/1441; H04L 63/164
USPC .................. 726/22–23, 2–3, 26–29; 713/150, 713/153–154, 162; 380/255
See application file for complete search history.

(56) References Cited

U.S. PATENT DOCUMENTS

| | | | |
|---|---|---|---|
| 5,935,245 | A | 8/1999 | Sherer |
| 6,292,896 | B1 | 9/2001 | Guski et al. |
| 6,950,427 | B1 | 9/2005 | Zinin |
| 7,307,999 | B1 | 12/2007 | Donaghey |
| 2004/0123143 | A1 | 6/2004 | Katz et al. |
| 2007/0070996 | A1 | 3/2007 | Oran |

FOREIGN PATENT DOCUMENTS

WO WO 03/032603 4/2003

OTHER PUBLICATIONS

RSA Laboratories, "What is SecurID?", http://www.rsa.com/rsalabs/node.asp?id=2303.*
Wikipedia, "RSA SecurID", http://en.wikipedia.org/wiki/SecurID.*
PCT Notification of Transmittal of the Intl. Search Report and the Written Opinion of the International Searching Authority, or the Declaration mailed Aug. 29, 2011, regarding Intl. Patent Application No. PCT/US2011/035446 filed May 6, 2011.

(Continued)

*Primary Examiner* — Darren B Schwartz
*Assistant Examiner* — John B King
(74) *Attorney, Agent, or Firm* — Cantor Colburn LLP (57) ABSTRACT

In certain embodiments, a first network device stores a security key associated with a second network device. The first network device computes access information according to the security key and a time value. The access information may be a network address or a port/socket. The first network device sends a packet to the second network device using the access information. The first network device then computes next access information according to the security key and a next time value and sends a packet to the second network device using the next access information.

22 Claims, 3 Drawing Sheets

(56) References Cited

OTHER PUBLICATIONS

Alex Biryukov et al., "Cryptanalysis of the Alleged SecurID Hash Function," Selected areas in Cryptography, pp. 130-144, XP019004152, May 15, 2004.

Keith A. Repik, "Defeating Adversary Network Intelligence Efforts with Active Cyber Defense Techniques," Graduate research paper, Jun. 1, 2008, XP55004366, Department of the Air Force, Air University, retrieved on Aug. 9, 2011.

Sifalakis et al., "Network Address Hopping, A Mechanism to Enhance Data Protection for Packet Communications," © 2005 *IEEE*, International Conference on Seoul, Korea, pp. 1518-1523, May 16, 2005.

Australian Office Action for corresponding AU Application No. 2011247963, dated Oct. 17, 2013, pp. 1-3.

New Zealand Office Action for corresponding NZ Application No. 603473, dated Aug. 21, 2013, pp. 1-2.

\* cited by examiner

TIME-KEY HOPPING

RELATED APPLICATION

This application claims benefit under 35 U.S.C. §119(e) of U.S. Provisional Application Ser. No. 61/332,609, entitled "PORT/SOCKET HOPPING NETWORK SYSTEM," filed 7 May 2010, by Bogart Vargas, which is incorporated herein by reference, and of U.S. Provisional Application Ser. No. 61/332,578, entitled "ADDRESS HOPPING NETWORK SYSTEM," filed 7 May 2010, by Bogart Vargas, which is incorporated herein by reference

BACKGROUND

An attack of a computer network system may attempt to gain unauthorized access to or make unauthorized use of a resource of the network system. For example, a hacker can mask his or her identity and sniff packets to learn the mapping of the network system, such as how the network is designed and where key items (e.g., routers) are located. The hacker can then attack the key items.

SUMMARY OF THE DISCLOSURE

In accordance with the present invention, disadvantages and problems associated with previous techniques for access information hopping may be reduced or eliminated.

In certain embodiments, a first network device stores a security key associated with a second network device. The first network device computes access information according to the security key and a time value. The access information may be a network address or a port/socket. The first network device sends a packet to the second network device using the access information. The first network device then computes next access information according to the security key and a next time value and sends a packet to the second network device using the next access information.

Certain embodiments of the invention may provide one or more technical advantages. A technical advantage of one embodiment may be that changing the network addresses makes it more difficult for unauthorized users to access a network. Another technical advantage of one embodiment may be that changing the ports/sockets makes it more difficult for unauthorized processes to access a device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals used for like and corresponding parts of the various drawings.

Security was not originally built into Internet Protocol (IP) networks. Certain protocols, such as the access control list (ACL) protocol, address security for accessing a resource or securing a communication link. In certain situations, however, a hacker can mask his or her identity and sniff packets to learn the mapping of a network, such as how the network is designed and where key items (e.g., routers) are located. For example, the hacker may learn access information, such as network addresses and/or ports/sockets. The hacker can then attack key items or create diversionary attacks to steal information. If static access information is used, then the hacker can continue the attacks.

Certain embodiments described herein may provide enhanced security over computer systems that use static access information. Certain embodiments may change the access information such that unauthorized users cannot maintain an attack on a system using previously known access information. For example, certain embodiments may change the network addresses to make it more difficult for unauthorized users to access a network. Other embodiments may change ports/sockets to make it more difficult for unauthorized processes to access a device.

Network Time-Key Hopping

Figure 1:
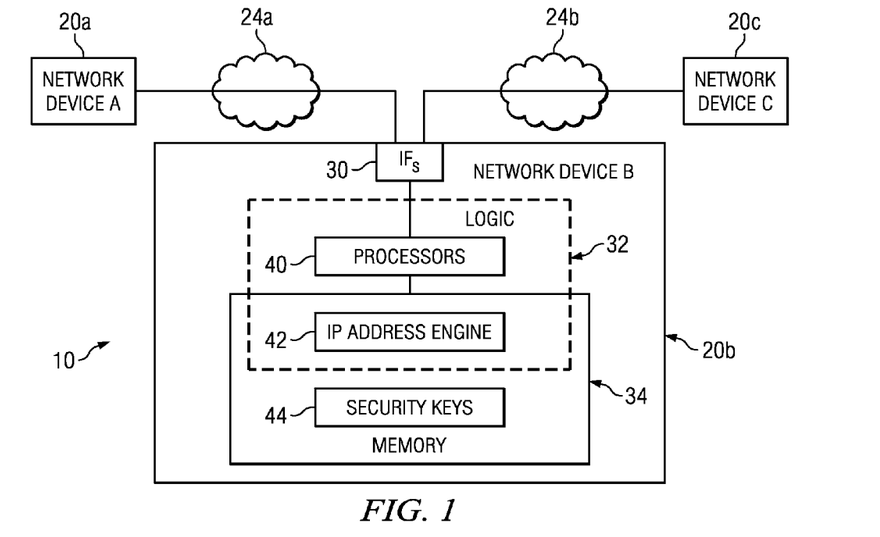
FIG. 1 illustrates an example of a network system that implements a technique that may be referred to as Network-to-Network Time-Key Hopping (NNTKH)

FIG. 1 illustrates an example of a network system 10 that implements a technique that may be referred to as Network-to-Network Time-Key Hopping (NNTKH). In certain embodiments, source network device 20 may calculate an Internet Protocol (IP) address of a destination network device 20 from a security key and a time value in order to send a packet to the destination network device. The IP address may change when calculated at a different time. In the embodiments, destination network device 20 may calculate the IP address of source network device 20 from a security key and a time value in order to validate a packet sent from the source network device 20.

In the example, network system 10 includes network devices A-C 20 (20a-c) coupled by communication networks 24 (20a-b). A network device 20 includes one or more interfaces (IFs) 30, logic 32, and one or more memories 34. Logic 32 includes one or more processors 40 and one or more applications such as Internet Protocol (IP) address engine 42. Memory 34 stores security keys 44.

A communication network 24 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network or link, an enterprise intranet, other suitable communication link, or any combination of any of the preceding.

A communication network 24 may include any suitable number of devices and links. For example, if network devices 20 belong to the same communication network, communication network 24 may be a link within the network. If network devices 20 belong to different communication networks, network 24 may be an entire network. In certain embodiments, each communication network 24 may be configured to operate independently of other networks 24. If one communication network 24 is compromised, devices of that network 24 may be instructed to use a new key.

A network device 20 may be any suitable device that mediates data in a computer network. Examples of network devices include gateways, routers, switches, bridges, hubs, repeaters, and endpoints. An endpoint may be any suitable device that communicate with another endpoint using a communication network, and may be operated by a user. Examples of endpoint 20 include a telephone such as a cellular telephone, a personal digital assistant, a computer such as a laptop, or a mobile device. In certain embodiments, a first network device 20 of a path may be adjacent to a second network device 20 of the path if the first network device 20 sends a packet along the path by addressing the packet to the second network device 20.

In certain embodiments, access information may be calculated from a key and a time value. For example, a network address for a network may be calculated from a key of the network and a time value, as described with reference to FIGS. 1 and 2. As another example, a port/socket for an application may be calculated from a port/socket security key of the application and a time value, as described with reference to FIGS. 3 and 4. In certain embodiments, the key/time value pair may be represented as a time-key=$(t_{LAN\ A}, key_{LAN\ A})$ where t=time. The access information may change as the time values change. For example, the network address for a network may change, or the port/socket for an application may be calculated may change. The access information may be computed in any suitable manner, for example, by applying mathematical functions to the key and/or time value.

A security key may be a sequence with pseudo-random characteristics that can be used as an encryption key at one end of communication, and as a decryption key at the other end. Examples of keys include public/private key sets that may be used according to Public Key Infrastructure (PKI).

A time value may be any suitable time value, such as an objective or relative time value. An objective time value that may be a function of a time distributed by a timekeeper. For example, a central server may distribute a time value T used to synchronize other network devices. An objective time value may be a function f(T) of a time T. A relative time value may be a function of time values t1 and t2 (which may be relative or objective), such as an elapsed time t2−t1.

In certain embodiments, a communication network 24 defines its own time such that network devices 20 of the network 24 are synchronized. Synchronized devices 20 can determine their own time values as well as the time values of other devices. In certain embodiments, the time values may have an acceptable deviation (or acceptable variation or error), such a t+/−d, where t represents the time value and d represents the acceptable deviation.

In certain embodiments, network device B stores a first security key associated with an adjacent network device C. Network device B determines a time value and computes a first IP address of network device C according to the security key and the time value. Network device B sends a packet to network device C using the first IP address. At a later time, network device B determines a next time value and computes a next IP address of network device C according to the security key and the next time value.

In the example of operation, network device B stores a second security key associated with adjacent network device A. Network device B determines a time value and computes an IP address of network device A according to the second security key and a second time value. The IP address is an address that an authorized device would be expected to use. Network device B receives a packet sent by network device A and having a source address. Network device B validates the source address according to the second IP address. For example, network device B may check whether the source address matches the second IP address.

In certain embodiments, network device B may change to a different security key for network device C. Network device B computes the IP address of network device C according to that security key and the current time value.

In certain embodiments, the network addresses (or post/sockets) may change according to a hopping schedule. The schedule may define the times for address changes in any suitable manner. For example, the schedule may indicate an elapsed time between address changes. The frequency of change may be set according to any suitable factor, such a Service Level Agreement (SLA) metric, mission, threat level, jitters, and intelligence. For example, the frequency may be higher (such as more than once an hour) during a higher threat level and lower (such as less than once a day) for a lower threat level. Moreover, different networks 24 may have the same or different frequencies of change, and may change addresses at the same or different times.

Figure 2:
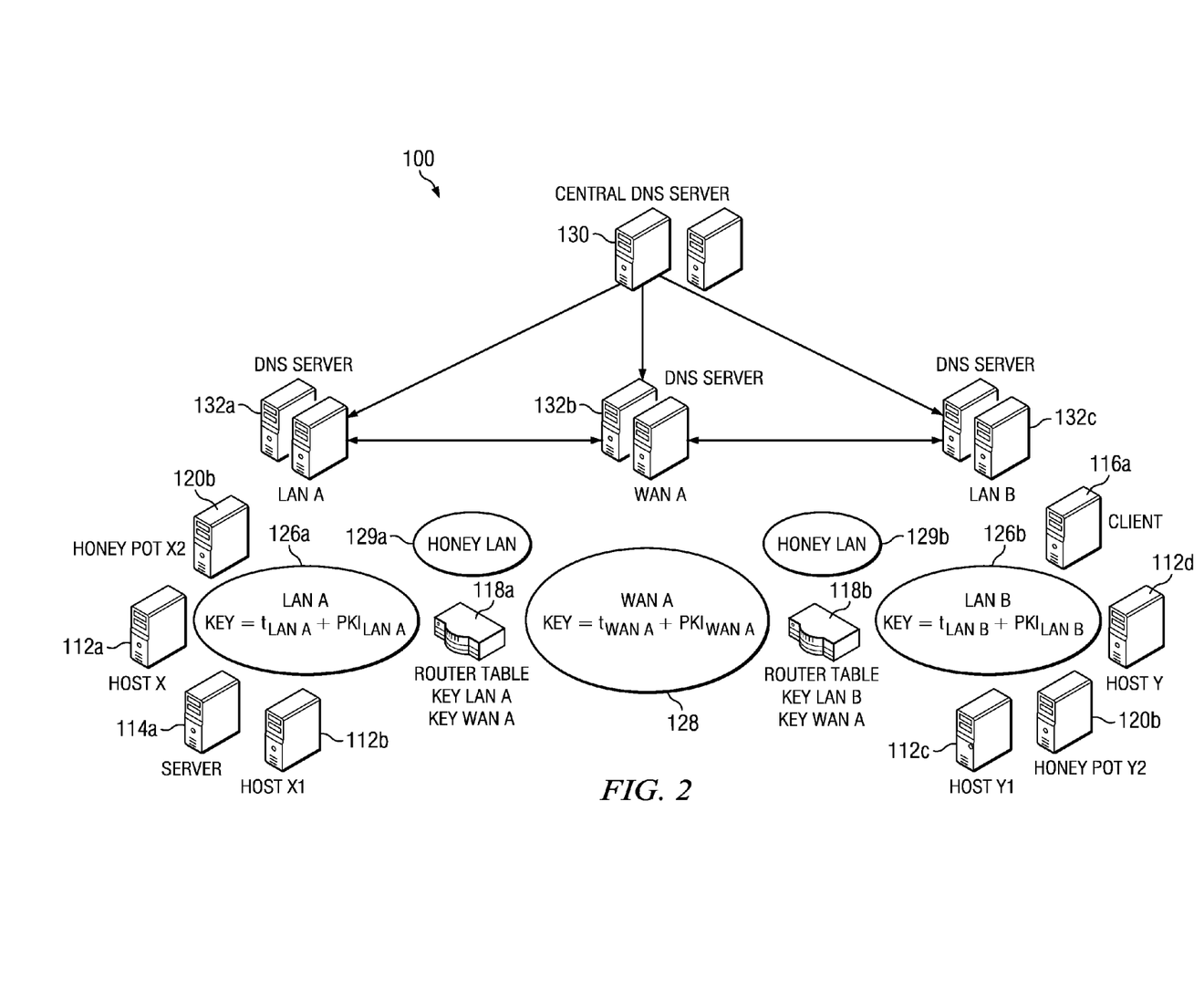
FIG. 2 illustrates another example of a network system that implements a Network-to-Network Time-Key Hopping technique.

FIG. 2 illustrates another example of a network system 100 that implements a Network-to-Network Time-Key Hopping technique. In certain embodiments, Network-to-Network Time-Key Hopping may be implemented using the Domain Name System (DNS) and may be referred to as Domain Name System Hopping IP (DNSHip).

Network system 100 includes one or more communication networks 124 that communicate with one another. Networks 124 include one or more local area networks (LANs) 126 (126a-b), one or more wide area networks (WANs) 128, and one or more honey LANs 129 (129a-b). Each network 124 includes one or more network devices, such as hosts 112 (112a-d), servers 114 (114a), clients 116 (116a), routers 118 (118a-b), and/or honey pots 120 (120a-b). Network system 100 also includes a central DNS server 130 and one or more LAN DNS servers 132 (132a-c).

DNS servers may facilitate distribution of time-key information. In certain embodiments, DNS servers may facilitate distribution of time information. For example, a communication network 24 defines its own time t+/−d, where t represents the time value from central DNS server 30, and stores the time in local DNS server 32. In certain examples, the time value may be Greenwich Mean Time (GMT). Local DNS server 32 shares the time with the adjacent network DNS servers 32 with which it plans to communicate.

In certain embodiments, DNS servers may facilitate distribution of key information. For example, each network 24 authenticates and/or loads its security key to devices (such as routers 18) between the networks 24. Central DNS server 30 serves security keys to DNS servers 32, which may distribute the keys to devices. The security keys may instruct routers 18 operating as gateways to modify their gateway network address and the gateway network addresses of the other network 24.

The time-key information may be communicated in any suitable manner. For example, DNS server 30 may distribute a record type that includes the time-key for a network on which the DNS server 30 resides and the Greenwich Mean Time (GMT) for which the packet was created. An IP address may be computed from the key, the time value, and/or the GMT. If router 18 receives a packet with a key that does not match the key of the router 18, router 18 may forward the packet according to protocols such as Time To Live (TTL). If router 18 receives a packet with a key that matches, router 18 resolves the packet to the requested server.

A network device of a network may use the security key to compute its next network address at a particular time, for example, after a particular time has elapsed. At a specified time, the network addresses change. For example, host 12a may have a network address of 192.168.1.150 and run mySql while honey-pot 20a may have a network address of 192.168.1.10 and run mySql. Host 12a's network address changes to 192.168.1.32 and honey-pot 20a's network address changes to 192.168.1.150. When the addresses change, the authorized devices know where to listen for packets and where to send packets, so communication is not lost. An unauthorized device, however, does not know where to listen for packets and where to send packets.

In the illustrated example, router 18a may have a hash key that comprises security keys $Key_{LAN\_A}$ for LAN 26a and $Key_{WAN\_A}$ for WAN 28. Router 18a may use $Key_{WAN\_A}$ and a time value to calculate an network address to send packets to WAN 28. If WAN 28 receives a packet that does not have the correct network address, WAN 28 can perform a defensive action on the packet. For example, WAN 28 may ignore the packet or send the packet to a honey-pot.

In the illustrated example, router 18a may use $Key_{LAN\_A}$ and a time value to calculate an network address to validate packets from LAN 26a. If router 18a receives a packet that does not have the correct network address, router 18a can ignore the packet. In certain embodiments, a network device may have N number of security keys, for N networks. A device may store at least three keys, in case a key is compromised.

Honey devices such as honey pots 20 and honey LANs provide false information to an unauthorized user and typically serve no other function. Any suitable number of honey devices may be used such as at least approximately 5 percent of network devices.

Port/Socket Time-Key Hopping

Figure 3:
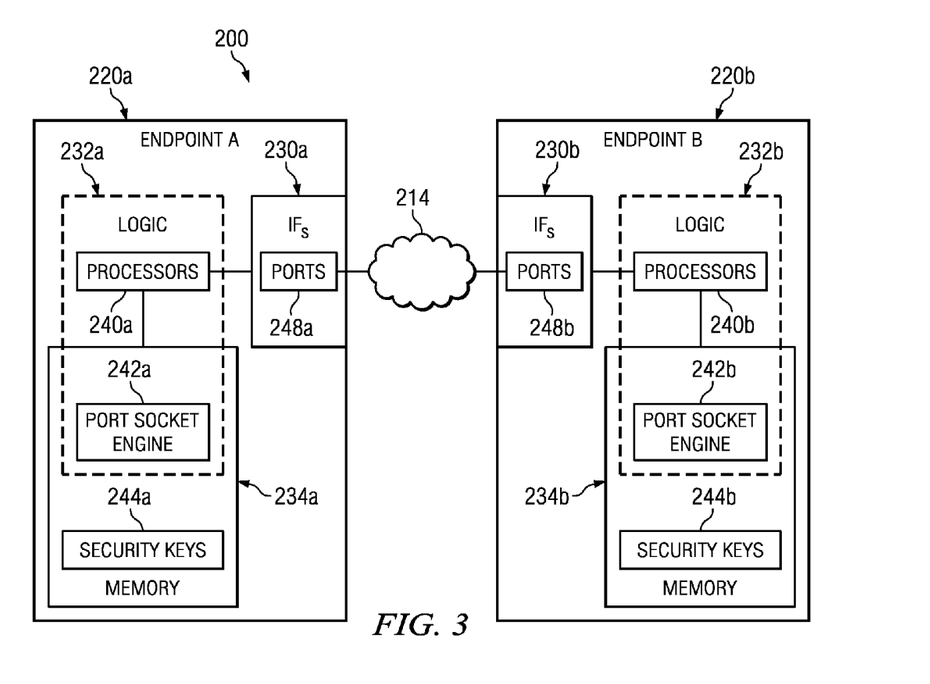
FIG. 3 illustrates an example of a network system 200 that implements a technique that may be referred to as Port/Socket Time-Key Hopping (PSTKH)

FIG. 3 illustrates an example of a network system 200 that implements a technique that may be referred to as Port/Socket Time-Key Hopping (PSTKH). In certain embodiments, an endpoint 220 may calculate a port/socket for a process from a security key and a time value in order to send a packet for the process. The port/socket may change when calculated at a different time. In the embodiments, a port/socket may refer to a port, a socket, or both a port and a socket.

In the example, system 200 includes endpoints 220 (220a-b) coupled by a communication network 214. Each endpoint 220 includes one or more interfaces (IFs) 230 (230a-b), logic 232 (232a-b), and one or more memories 234 (234a-b). Interfaces 230 may include one or more ports 248. Logic 232 may include one or more processors 240 (240a-b) and a port/socket engine 242 (242a-b). Memory 234 may store security keys 244 (244a-b). System 100 may include devices of system 200, and system 200 may include devices of system 100. For example, system 200 may include honey pots 120 or honey LANs 129.

In certain embodiments, a first endpoint 220a initiates communication with a second endpoint 220b. First endpoint 220a determines a port/socket security key for the communication, synchronizes time between first and second endpoints 220, and calculates a port/socket according to a time value and the port/socket security key. First endpoint 220a communicates with second endpoint 220b using the port/socket. At a different time, first endpoint 220a calculates a next port/socket according to a next time value and the port/socket security key and communicates with second endpoint 220b using the next port/socket. In certain embodiments, a first endpoint 220a derives the port/socket security key from a network security key.

A port 248 of a computer is a software address and may be mapped to a particular process (or application). A socket address may be the combination of an IP address of the computer and a port. In certain embodiments, a port/socket may refer to a port, a socket, or both a port and a socket. In certain embodiments, a port/socket for an application may be calculated from a port/socket security key of the application and a time value.

In certain embodiments, port/socket hopping engine 24 computes a port/socket using a security key and an elapsed time. Port/socket hopping engine 242 generates a security key and defines and shares its own time with port/socket hopping engine 242 with which it wants to communicate.

An endpoint may obtain the port/socket security key in any suitable manner. In certain embodiments, the port/socket security key may be derived from a network security key. For example, a mathematical function may be applied to the network security key in order to derive the port/socket security key.

Figure 4:
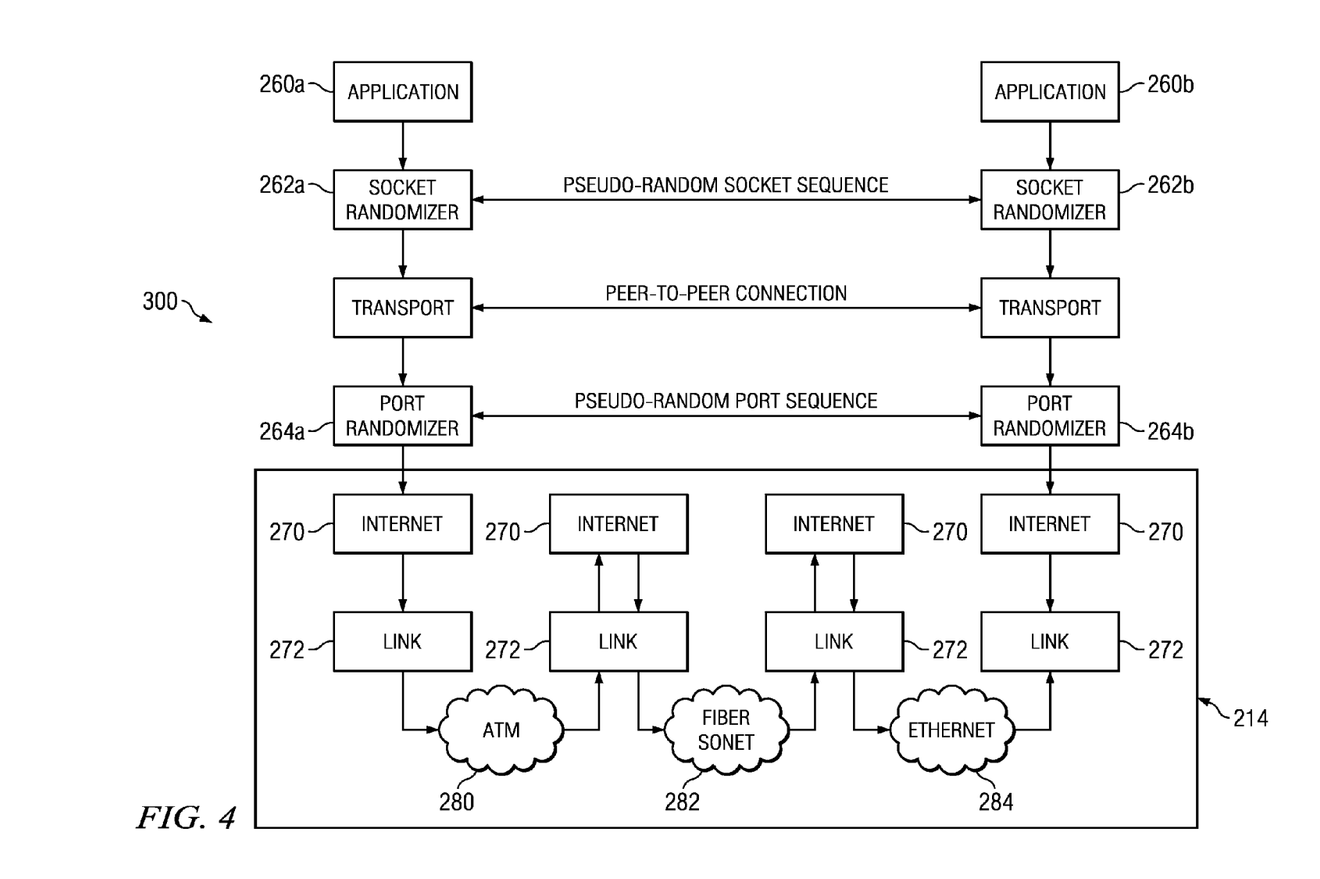
FIG. 4 illustrates another example of a network system that implements a Port/Socket Time-Key Hopping technique.

FIG. 4 illustrates an example of a system 200 that may utilize the PSTKH technique. A port/socket hopping engine 242 includes a socket randomizer 252 and a port randomizer 254 that selects a port/socket from multiple ports/sockets. In the illustrated example, communication network 214 includes links 272, the Internet 270, an Asynchronous Transfer Mode (ATM) network 280, a Synchronous Optical Network (SONET) network 282, and an Ethernet network 284 to establish connections between applications 260 (260a-b).

An application 260 may be any suitable computer application or process. For example, application 260 may be an Internet Relay Chat (IRC) application 260 executed on one endpoint 220 and may be communicating with another IRC application 260 on the other endpoint 220. At a first time, the IRC applications 260 may communicate through port 293 of a Transfer Control Protocol (TCP) connection. After a period of time specified by the security key, a new port may be selected such that applications 260 communicate through port 524 of a TCP connection. The security key may also instruct port/socket hopping engine 242 to select a socket such that the IRC applications 260 are coupled together through a User Datagram Protocol (UDP) connection.

In the illustrated example, port/socket hopping engine 242 creates a connection between applications 260 using a security key. In the example, a network time-key is known.

1. A process requests a socket.
2. The network access privilege and security key of the process are checked.
3. The network time key is checked.
4. Port/socket hopping engine 242a authenticates that the process has access rights to communicate on a specific channel with a destination network address. For example, port/socket hopping engine 242a checks one or more of the following parameters: a process ID (PID), a security key, and a destination network address.
5. Time-Sync packet is sent to the destination network address.
6. Endpoints 220 may establish a synchronized time and variance allowance between endpoints.
7. Port/socket hopping engine 242a changes ports/sockets from which packets are sent and/or ports/sockets at which packets are received according a schedule. Port/socket hopping engine 242b follows the same schedule. If an endpoint 220 receives a packet that does not satisfy the schedule, for example, does not have the correct port/socket at the particular time, endpoint 220 may perform a defensive action on the packet.

In certain embodiments, PSTKH may be implemented on certain ports and/or sockets but not on other ports and/or sockets. For example, a File Transfer Protocol (FTP) static port may remain open for a system that does not support hopping.

Changing ports/sockets may increase resource costs. Memory is O(1), and computer performance utilization may be approximately O(log log n) at the low end and O(n^2) at the high end. To help distribute computer utilization, other processors can be used by the system. For instance, by using Open Computing Language (OpenCL), PSTKH may leverage processing capabilities of a Graphics Processing Unit (GPU). The number of resources utilized may correlate to the number of network connections.

In certain embodiments, PSTKH may address security short-falls of protocols such as Secure Shell (SSH)/Secure Sockets Layer (SSL). In SSH/SSL, the communication port associated with each application is static once a connection has been established, and SSL/SSH assumes that the connection established between points is legitimate. An external threat might identify the SSH/SSL vendor and release, then attack. Metadata or other protocol mechanisms used between endpoints may be discovered without decrypting the communication. With PSTKH, the ports/sockets change such that the external threat cannot maintain a valid connection.

In certain embodiments, port/socket hopping engine 242 may configure a connection to have a discreet time-to-live before the connection is reset, or may compute a new key and jump to a new hopping sequence. If a security key is compromised, only the hopping sequence between two endpoints 220 is affected and the messages may remain encrypted.

In certain embodiments, port/socket hopping engine 242 may direct packets with invalid ports/sockets to a honey port/socket. A honey port/socket provides false information to an unauthorized user and typically serves no other function. Any suitable number of ports/sockets may be used.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of an engine 42 or 242 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

In certain embodiments, an entity that performs a first step that precedes (such as leads to) a second step may be regarded as facilitating the second step. For example, if an entity performs step A that precedes step B, the entity also facilitates step B. In certain embodiments, a first entity that performs a first step that precedes a second step that may be performed by a second entity may be regarded as allowing the second entity to perform the second step. For example, if a first entity performs step A that precedes step B that may be performed by a second entity, the first entity also allows the second entity to perform step B.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   storing, at one or more memories of a network device, a first security key associated with a first adjacent network device;
   determining, by one or more processors of the network device, a time value;
   computing, by the one or more processors, a first Internet Protocol (IP) address of the first adjacent network device according to the first security key and the time value;
   sending a packet to the first adjacent network device using the first IP address;
   determining, by the one or more processors, a next time value; and computing, by the one or more processors, a next IP address of the first adjacent network device according to the first security key and the next time value; and
   determining, by the one or more processors, a first hopping schedule that controls the computing of the next IP address based on the first security key according to a first frequency: and a second hopping schedule that controls the computing of the next IP address based on the first security key according to a second frequency higher than the first frequency and dynamically switching from the first hopping schedule to the second hopping schedule in response to detecting a change in a network factor corresponding to at least one of the network device and the first adjacent network device.

2. The method of claim 1: the network device belonging to a first communication network; and the first adjacent network device belonging to a second communication network.

3. The method of claim 1: the network device and the first adjacent network belonging to the same communication network.

4. The method of claim 1, wherein the network factor is at least one of a task, a threat level, and intelligence.

5. The method of claim 1, further comprising: storing, at the one or more memories, a second security key associated with a second adjacent network device; computing, by the one or more processors, a second IP address of the second adjacent network device according to the second security key and a second time value; and receiving a packet sent by the second adjacent network device using the second IP address.

6. The method of claim 1, further comprising: computing, by the one or more processors, a second IP address of a second adjacent network device according to a second security key and a second time value; receiving a second packet sent by the second adjacent network device, the second packet having a source address; and validating the source address according to the second IP address.

7. The method of claim 1, further comprising: storing, at the one or more memories, a third security key associated with the first adjacent network device; and computing, by the one or more processors, a third IP address of the first adjacent network device according to the third security key and a next time value.

8. One or more non-transitory computer readable media storing logic when executed by a processor perform the operations of:
storing, at one or more memories of a network device, a first security key associated with a first adjacent network device;
determining a time value; computing a first Internet Protocol (IP) address of the first adjacent network device according to the first security key and the time value;
sending a packet to the first adjacent network device using the first IP address;
determining, by the one or more processors, a next time value; and computing, by the one or more processors, a next IP address of the first adjacent network device according to the first security key and the next time value; and
determining, by the one or more processors, a first hopping schedule that controls the computing of the next IP address based on the first security key according to a first frequency and a second hopping schedule that controls the computing of the next IP address based on the first security key according to a second frequency that is higher than the first frequency, and dynamically switching from the first hopping schedule to the second hopping schedule in response to detecting a change in a network factor corresponding to at least one of the network device and the first adjacent network device.

9. The non-transitory computer readable media of claim 8: the network device belonging to a first communication network; and the first adjacent network device belonging to a second communication network.

10. The non-transitory computer readable media of claim 8: the network device and the first adjacent network belonging to the same communication network.

11. The non-transitory computer readable media of claim 8, wherein the network factor is at least one of a task, a threat level, and intelligence.

12. The non-transitory computer readable media of claim 8, the logic further operable to: store a second security key associated with a second adjacent network device; compute a second IP address of the second adjacent network device according to the second security key and a second time value; and receive a packet sent by the second adjacent network device using the second IP address.

13. The non-transitory computer readable media of claim 8, the logic further operable to: compute a second IP address of a second adjacent network device according to a second security key and a second time value; receive a second packet sent by the second adjacent network device, the second packet having a source address; and validate the source address according to the second IP address.

14. The non-transitory computer readable media of claim 8, the logic further operable to: store a third security key associated with the first adjacent network device; and compute a third IP address of the first adjacent network device according to the third security key and a next time value.

15. A method comprising:
initiating, by one or more processors of a first endpoint, communication with a second endpoint;
determining one or more port/socket security keys for the communication;
synchronizing time between the first endpoint and the second endpoint;
calculating a port/socket according to a time value and the port/socket security keys;
communicating with the second endpoint using the port/socket;
calculating a next port/socket according to a next time value and the port/socket security keys; and communicating with the second endpoint using the next port/socket; and
determining, by the one or more processors, a first hopping schedule that controls the calculating of the next port/socket according to a first frequency based on the port/socket security keys and a second hopping schedule that controls the computing of the next port/socket based on the port/socket security keys according to a second frequency different from the first frequency and dynamically switching from the first hopping schedule to the second hopping schedule in response to detecting a change in a network factor corresponding to at least one of the first endpoint and the second endpoint.

16. The method of claim 15, wherein the network factor is at least one of a task, a threat level, and intelligence.

17. The method of claim 15, the determining the port/socket security key further comprising: deriving at least one port/socket security key from a network security key.

18. The method of claim 15, further comprising: determining a static port/socket of the second endpoint; and communicating with the second endpoint using the static port/socket.

19. One or more non-transitory computer readable media storing logic when executed by a processor perform the operations of:
initiating, by a first endpoint, communication with a second endpoint;

determining one or more port/socket security keys for the communication;
synchronizing time between the first endpoint and the second endpoint;
calculating a port/socket according to a time value and the port/socket security keys;
communicating with the second endpoint using the port/socket;
calculating a next port/socket according to a next time value and the port/socket security keys; and communicating with the second endpoint using the next port/socket; and
determining, by the one or more processors, a first hopping schedule that controls the calculating of the next port/socket based on the port/socket security keys according to a first frequency and a second hopping schedule that controls the computing of the next port/socket based on the port/socket security keys according to a second frequency different from the first frequency, and dynamically switching from the first hopping schedule to the second hopping schedule in response to detecting a change in a network factor corresponding to at least one of the first endpoint and the second endpoint.

20. The non-transitory computer readable media of claim 19, wherein the network factor is at least one of a task, a threat level, and intelligence.

21. The non-transitory computer readable media of claim 19, the determining the port/socket security key further comprising: deriving at least one port/socket security key from a network security key.

22. The non-transitory computer readable media of claim 19, the logic further operable to: determine a static port/socket of the second endpoint; and communicate with the second endpoint using the static port/socket.

* * * * *

UNITED STATES PATENT AND TRADEMARK OFFICE
CERTIFICATE OF CORRECTION

PATENT NO.       : 8,793,792 B2
APPLICATION NO.  : 13/101402
DATED            : July 29, 2014
INVENTOR(S)      : Bogart Vargas It is certified that error appears in the above-identified patent and that said Letters Patent is hereby corrected as shown below:

IN THE CLAIMS

In column 9, line 2, delete "frequency:" and insert --frequency,--, therefor

In column 9, line 10, delete "claim 1:" and insert --claim 1,--, therefor In column 9, line 13, delete "claim 1:" and insert --claim 1,--, therefor In column 9, line 66, delete "claim 8:" and insert --claim 8,--, therefor In column 10, line 3-4, delete "claim 8:" and insert --claim 8,--, therefor Signed and Sealed this
Fifteenth Day of March, 2016

Michelle K. Lee
*Director of the United States Patent and Trademark Office*